United States Patent [19]

Jaeger et al.

[11] Patent Number: 4,889,560
[45] Date of Patent: Dec. 26, 1989

[54] PHASE CHANGE INK COMPOSITION AND PHASE CHANGE INK PRODUCED THEREFROM

[75] Inventors: Charles W. Jaeger, Beaverton; Donald R. Titterington, Tualatin, both of Oreg.; Hu P. Le, Westminster, Calif.; Jeffrey J. Sopko, Portland, Oreg.

[73] Assignee: Tektronix, Inc., Beaverton, Oreg.

[21] Appl. No.: 227,846

[22] Filed: Aug. 3, 1988

[51] Int. Cl.[4] .............................................. C09D 11/06
[52] U.S. Cl. ............................. 106/27; 260/DIG. 38; 260/404.5; 528/339.3
[58] Field of Search ................. 106/27; 260/404.5 PA, 260/DIG. 38, 404.5 PP; 528/339.3

[56] References Cited

U.S. PATENT DOCUMENTS

| | | | |
|---|---|---|---|
| 3,156,572 | 11/1964 | Carlick et al. | 106/27 |
| 3,244,734 | 4/1966 | Sonntag | 106/20 |
| 3,383,391 | 5/1968 | Carlick et al. | 106/27 |
| 3,420,789 | 1/1969 | Wilson | 106/27 |
| 3,522,270 | 7/1970 | Glaser | 106/27 |
| 3,622,604 | 11/1971 | Drawert et al. | 106/27 |
| 3,652,469 | 3/1972 | Glaser et al. | 106/27 |
| 3,793,270 | 2/1974 | Goukon et al. | 106/27 |
| 4,400,216 | 8/1983 | Arora | 106/23 |
| 4,703,335 | 10/1987 | Matsushita et al. | 427/152 |
| 4,830,671 | 5/1989 | Frihart et al. | 106/27 |

*Primary Examiner*—Paul Lieberman
*Assistant Examiner*—Helene Klemanski
*Attorney, Agent, or Firm*—John D. Winkelman; Jerome S. Marger

[57] ABSTRACT

A phase change ink carrier composition is combined with a compatible colorant to form a phase change ink composition of this invention. A thin film of substantially uniform thickness of that phase change ink carrier composition, and the ink produced therefrom, has a high degree of lightness and chroma. The thin films of a substantially uniform thickness of the ink composition are also rectilinearly light transmissive. The carrier composition is preferably a fatty amide-containing compound.

31 Claims, No Drawings

PHASE CHANGE INK COMPOSITION AND PHASE CHANGE INK PRODUCED THEREFROM

BACKGROUND OF THE INVENTION

The present invention relates to phase change ink carrier compositions and to phase change inks produced therefrom which are useful in ink jet printing devices.

In general, phase change inks are in solid phase at ambient temperature, but exist in liquid phase at the elevated operating temperature of an ink jet printing device. Liquid phase ink jet drops at the operating temperature are ejected from the printing device and, when the ink drops contact the surface of a wide variety of printing media, they quickly solidify to form a predetermined pattern of solidified ink drops.

Phase change ink is desirable since it remains in a solid phase at room temperature, during shipping, long-term storage, etc. Also, the problems associated with nozzle clogging due to ink evaporation are largely eliminated, thereby improving the reliability of ink jet printing. Furthermore, since the ink droplets solidify immediately upon contact with the substrate, migration of ink along the printing medium is prevented and dot quality is improved.

The initial prior art on phase change inks for ink jet printing involved monochrome inks jetted by electrostatic printing devices. Thus, for example in U.S. 3,653,932, a low melting ink (30° C. to 50° C.) is provided employing an ink base comprising di-esters of sebacic acid In a similar process, U.S. Pat. No. 3,715,219 describes another low melting point ink (30° C. to 60° C.) comprising a paraffin alcohol-based ink However, when low melting point phase change inks are employed in printing onto a substrate, they exhibit offset problems, namely, when the printed substrates formed from these inks are stacked and stored for subsequent use, they can become adhered to one another, particularly if high ambient temperatures are experienced.

U.S. Pat. Nos. 4,390,369 and 4,484,948 describe methods for producing monochrome phase change inks which employ a natural wax ink base, such as Japan wax, candelilla wax, carnauba wax, etc., which is printed from a drop-on-demand ink jet device at a temperature ranging between 65° C. and 75° C. In U.S. Pat. No. 4,659,383, a monochrome ink composition is provided having an ink base comprising a C20-24 acid or alcohol, a ketone, and an acrylic resin plasticizer. These monochrome ink compositions are not durable and when printed can be smudged with routine handling and folding.

In Japanese patent application No. 128,053/78, amides which are solid at room temperature, such as acetamide, are employed as printing inks. U.S. Pat. No. 4,684,956 is directed to monochrome phase change inks utilizing synthetic microcrystalline wax (hydrocarbon wax) and microcrystalline polyethylene wax. This molten composition can be applied to a variety of porous and non-porous substrates using drop-on-demand ink jet application techniques.

Finally, EP Nos. 0187352 and 0206286 reference phase change ink jet printing in color. The ink bases for these systems comprise fatty acids, a thermoplastic polyethylene and a phase change material in the first application; and the alcohol portion of a thermal setting resin pair, a mixture of organic solvents (o-and p-toluene sulfonamide) and a dye in the second application.

Jet printing colored inks on to a light transmissive medium for displaying color images by overhead projection has historically been a problem. For example, in the case of aqueous inks, special coatings must be provided on the light transmissive medium in order to absorb the aqueous phase so that images of high quality are formed. See, for example, U.S. Pat. Nos. 4,503,111, 4,547,405 and 4,555,437. Even though special coatings are not required on receptor films used for phase change ink jet printing, when prior art color phase change inks are applied in a thin film of substantially uniform thickness to a light transmissive receiver sheet, they are not rectilinearly light transmissive. Therefore, they cannot be effectively employed for displaying color images by overhead projection techniques.

Therefore, a need exists for a phase change ink composition which is rectilinearly light transmissive as a thin film of substantially uniform thickness so that an image comprising intense colors of a predetermined pattern of the phase change ink can be visibly projected on an overhead projector, for example, the 3M Company's 413 Overhead Projector. The ink should also be durable and exhibit a single melting point transition at a relatively high temperature.

SUMMARY OF THE INVENTION

The phase change ink carrier composition of this invention, and the phase change ink produced therefrom, overcome the problems present in the phase change inks of the prior art systems as described above.

The subject carrier composition is combined with a compatible colorant to form the phase change ink composition of this invention. A thin film of substantially uniform thickness of that phase change ink carrier composition, and the ink produced therefrom, have a high degree of lightness and chroma. The thin films of a substantially uniform thickness of the ink composition are also rectilinearly light transmissive.

Preferably, the phase change carrier composition comprises a fatty amide-containing material. A process of this invention for producing the above phase change ink carrier composition comprises the step of using a fatty amide-containing compound, while a novel process of the present invention entails the steps of combining a fatty amide-containing material and a compatible colorant. The fatty amide-containing material is typically a tetra-amide compound and/or a mono-amide compound.

The foregoing and other objects, features and advantages of the invention will become more readily apparent from the following detailed description of a preferred embodiment which proceeds with reference to the drawings.

DETAILED DESCRIPTION OF THE INVENTION

This invention is directed to phase change ink carrier compositions useful in producing phase change inks. The subject phase change ink carrier composition typically comprises a fatty amide-containing material. The fatty amide-containing material of the phase change ink carrier composition of the present invention preferably comprises a tetra-amide compound. The preferred tetra-amide compounds for producing the phase change ink carrier composition are Dimer acid-based tetra-amides which preferably include the reaction product of a fatty acid, a diamine (ethylene diamine) and a Dimer acid. Fatty acids having from 10 to 22 carbon atoms are preferably employed in the formation of the Dimer acid-based tetra-amide. These Dimer acid-based tetra-amides are produced by Union Camp and comprise the reaction product of ethylene diamine, Dimer acid, and the following fatty acids: decanoic acid (Union Camp X3202-23), myristic acid (Union Camp X3202-56), stearic acid (Union Camp X3138-43, X3164-23, X3202-44, X3202-46, X3222-65, X3261-37, X3261-53, and X3290-72), docasanic acid (Union Camp X3202-36). For purposes of this invention, the most preferred Dimer acid-based tetra-amide is the reaction product of Dimer acid, ethylene diamine and stearic acid in a stoichiometric ratio of 1:2:2. Stearic acid is the preferred fatty acid reactant because its adduct with Dimer acid and ethylene diamine has the lowest viscosity of the Dimer acid-based tetra-amides. Its ingredients also are the most readily available and therefore lowest in cost.

The fatty amide-containing material can also comprise a mono-amide. In fact, in the preferred case, the phase change ink carrier composition comprises both a tetra-amide compound and a mono-amide compound. The mono-amide compound typically comprises either a primary or secondary mono-amide, but is preferably a secondary mono-amide. Of the primary mono-amides, stearamide, such as Kemamide S, manufactured by Witco Chemical Company, can be employed herein. As for the secondary mono-amides, behenyl behenamide (Kemamide EX666), and stearyl stearamide (Kemamide S-180 and Kemamide EX-672), all manufactured by Witco Chemical Company, are extremely useful mono-amides. However, stearyl stearamide is the mono-amide of choice in producing the phase change ink carrier composition of the present invention.

Another way of describing the preferred secondary mono-amide compound of this invention is by structural formula. More specifically, the secondary mono-amide compound comprised as a composition which is represented by the structural formula:

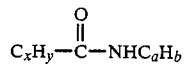

wherein:
x is an integer from 5 to 21
y is an integer from 11 to 43
a is an integer from 6 to 22
b is an integer from 13 to 45

The preferred fatty amide-containing compounds of this invention comprise a plurality of fatty amide materials which are physically compatible with each other. Typically, even when a plurality of fatty amide-containing compounds are employed to produce the phase change ink carrier composition, the carrier composition has a substantially single melting point transition. The melting point of the phase change ink carrier composition is preferably at least about 70° C., more preferably at least about 80° C., and most preferably at least about 85° C.

The preferred phase change ink carrier composition comprises a tetra-amide and a mono-amide. The weight ratio of the tetra-amide to the mono-amide in the preferred instance is from about 2:1 to 1:10, and more preferably, from about 1:1 to 1:3.

In order to add more flexibility and adhesion to the phase change ink carrier composition, a tackifier can be employed. The preferred tackifiers are those which are compatible with fatty amide-containing materials. These include, for example, Foral 85, a glycerol ester of hydrogenated abietic (rosin) acid, and Foral 105, a pentaerythritol ester of hydroabietic (rosin) acid, both manufactured by Hercules Chemical Company; Nevtac 100 and Nevtac 80, synthetic polyterpene resins manufactured by Neville Chemical Company; and Wingtack 86, a modified synthetic polyterpene resin manufactured by Goodyear Chemical Company. However, Foral 105 is the tackifier of choice in producing the phase change ink carrier composition of the present invention.

Another compound which can be added in forming the subject phase change ink carrier composition is a plasticizer which is incorporated into the carrier composition to increase its flexibility and lower its melt viscosity. Plasticizers which have been found to be particularly advantageous in the composition of the subject invention preferably include dioctyl phthalate, diundecyl phthalate, alkylbenzyl phthalate (Santicizer 278) and triphenyl phosphate, all manufactured by Monsanto Chemical Company; tributoxyethyl phosphate (KP-140) manufactured by MC Corporation; dicyclohexyl phthalate (Morflex 150) manufactured by Morflex Chemical Company Inc.; and trioctyl trimellitate, manufactured by Kodak. However, Santicizer 278 is the plasticizer of choice in producing the phase change ink carrier composition of the present invention.

Other materials may be added to the phase change ink carrier composition. In a typical phase change ink chemical composition antioxidants are added for preventing discoloration of the carrier composition. The preferred antioxidant materials can include Irganox 1010 manufactured by Ciba Geigy; and Naugard 76, Naugard 512, and Naugard 524 manufactured by Uniroyal Chemical Company; the most preferred antioxidant being Naugard 524.

In a preferred case, the phase change ink carrier composition comprises a tetra-amide and a mono-amide compound, a tackifier, a plasticizer, and a viscosity modifying agent. The preferred compositional ranges of this phase change ink carrier composition are as follows: From about 10 to 50 weight percent of a tetraamide compound, from about 30 to 80 weight percent of a mono-amide compound, from about 0 to 25 weight percent of a tackifier, from about 0 to 25 weight percent of a plasticizer, and from about 0 to 10 weight percent of a viscosity modifying agent.

As previously indicated, the subject phase change ink formed from the phase change ink carrier composition exhibits excellent physical properties. For example, the subject phase change ink, unlike prior art phase change inks, exhibits a high level of lightness, chroma, and rectilinear light transmissivity when utilized in a thin film of substantially uniform thickness, so that color images can be conveyed using overhead projection techniques.

The transmission spectra for each of the phase change inks used in this invention were evaluated on commercially available spectrophotometer, the ACS Spectro-Sensor II, in accordance with the measuring methods stipulated in ASTM E805 (Standard Practice of Instrumental Methods of Color or Color Difference Measurements of Materials) using the appropriate calibration standards supplied by the instrument manufacturer. For purposes of verifying and quantifying the overall colorimetric performance of this invention, measurement data were reduced, via tristimulus integration, following ASTM E308 (Standard Method for Computing the Colors of Objects using the CIE System) in order to calculate the 1976 CIE L* (Lightness), a* (redness-greeness), and b* (yellowness-blueness), (CIELAB) values for each phase change ink sample. In addition, the values for CIELAB Psychometric Chroma, $C^*_{ab}$, and CIELAB Psychometric Hue Angle, $h_{ab}$ were calculated according to publication CIE 15.2, Colorimetry (Second Edition, Central Bureau de la CIE, Vienna, 1986).

Unlike conventional phase change ink carriers, the nature of phase change ink carrier composition of the present invention is such that thin films of substantially uniform thickness exhibit a relatively high L* value. The phase change ink carrier composition of this invention preferably has an L* value, as a substantially uniform thin film of about 20 micron thickness, of preferably at least about 65, more preferably at least about 75, and most preferably at least about 85.

The phase change inks formed therefrom have, in addition to a relatively high L* value, a relatively high $C^*_{ab}$ value when measured as a thin film of substantially uniform thickness. Conventional phase change inks have a very low degree of rectilinear light transmissivity, even in thin films of substantially uniform thickness. The phase change ink composition has a $C^*_{ab}$ value, as a substantially uniform thin film of about 20 micron thickness, of subtractive primary yellow, magenta and cyan color phase change ink compositions, which preferably are at least about 50 for said yellow ink composition, at least about 50 for said magenta ink composition, and at least about 30 for said cyan ink composition. More preferably, the $C^*_{ab}$ value of the subtractive primary yellow, magenta and cyan color phase change ink compositions are at least about 60, 60, and 35, respectively; and most preferably these $C^*_{ab}$ values are 67, 69, and 40, respectively.

It is also important that the black color phase change ink component be at a minimum light transmissivity level so that the color intensity of the ink is maximized. Accordingly, the L* value of a substantially uniform thin film of about 20 micron thickness of a black color phase change ink is preferably not more than about 35, more preferably not more than about 30, and most preferably not more than about 25.

The respective phase change ink and ink carrier compositions are quite durable. One indication of durability is abrasion resistance. For purposes of this invention, abrasion resistance is determined by testing a print sample of the phase change ink produced from the carrier composition in a Teledyne Taber Abrader, Model 5130, utilizing CS-10 Abrasion wheels loaded with 500 gram weights. The Abrader Wheels are resurfaced after each sample with an S-11 resurfacing disk. Samples printed on paper were tested according to ASTM D4060-84 (Standard Test Method For Abrasion Resistance of Organic Coatings by the Taber Abrader). Samples printed on light transmissive thin films were tested using ASTM D1044-85 (Standard Test Method For Resistance of Transparent Plastics to Surface Abrasion). Print samples were tested as described above, and the results of those tests demonstrated excellent abrasion resistance.

A further physical property employed to evaluate the durability of phase change inks and ink carrier compositions is offset transfer. This property is evaluated by a blocking (offsetting) test which determines whether the phase change ink printed on a substrate will adhere to an adjacent substrate at ambient or elevated temperatures when the printed products are piled one on top of the other. The blocking test is conducted by printing samples of the phase change ink produced from the carrier composition on to a paper or thin film substrate and placing same in a manila folder under a one pound piece of aluminum, 8.5 inches wide and 11 inches long, which evenly distributes the weight of a 10 pound block. These printed samples reside in an oven for 24 hours at a constant temperature of 70° C. Print samples of the phase change ink were subjected to the above described blocking test and showed no signs of offsetting, spreading or adhesion.

Another important property of phase change inks is viscosity. The viscosity of the molten ink must be matched to the requirements of the ink jet device and optimized versus other physical properties of the ink. For purposes of this invention, the viscosity of the phase change ink is measured on a Ferranti-Shirley Cone Plate Viscometer with a large cone. It is preferred that the viscosity of the phase change ink carrier composition, at 150° C., and in turn the ink composition of this invention, is from about 5 to 30 cps, and more preferably from about 9 to 12 cps.

The viscosity of the phase change ink carrier composition, and ultimately of the ink formed therefrom, can be reduced by about 10–20% by employing a viscosity modifying agent. Preferred materials for use as such agents are aliphatic ketones, and more preferably stearone, in a use level not more than 10 weight percent.

The phase change ink carrier composition forms an ink by combining the same with a colorant. Preferably, a subtractive primary colored phase change ink set will be formed by combining the ink carrier composition with compatible subtractive primary colorants. The subtractive primary colored phase change inks of this invention comprise four component dyes, namely, cyan, magenta, yellow and black. Preferably, the subtractive primary colorants employed comprise dyes from either class of Color Index (C.I.) Solvent Dyes and Disperse Dyes. Employment of some C.I. Basic Dyes has also been successful by generating, in essence, an in situ Solvent Dye by the addition of an equimolar amount of sodium stearate with the Basic Dye to the phase change ink carrier composition. Acid Dyes and Direct Dyes have also been found to be compatible to a certain extent.

EXAMPLE 1

This example demonstrates a method of producing a preferred phase change ink of the primary subtractive color, using a preferred phase change ink carrier composition. More specifically, solid phase change ink ingots of the subtractive primary colors were produced as follows: 56 grams of Kemamide S-180, 30 grams of Unirez X37-523-235 (a Dimer acid-based tetra-amide material manufactured by Union Camp and formed by the reaction of one mole of dimer acid, two moles of ethylene diamine, and two moles of stearic acid), 10 grams of Foral 105, 4 grams of Santicizer 278, and 1 gram of Intratherm Yellow 346 yellow colorant (Crompton and Knowles, C.I. Disperse Yellow 238), were added to a 500 1l. beaker and heated with stirring to a temperature of 150° C. After a homogeneous solution of the materials was achieved, the molten ink was filtered through a heated funnel containing a fine stainless steel mesh screen. The filtrate was poured into molds and allowed to solidify. Solid ink ingots of the yellow colorant were formed.

The above procedure was repeated with the other primary colorants required for ink jet color printing being substituted for the yellow colorant as follows: 2 grams of Neptun Red Base NB 543 (BASF, C.I. Solvent Red 49) to produce magenta solid ink ingots; 2.4 grams of Neopen Blue FF-4012 primary cyan colorant (BASF, no Color Index number assigned yet) to produce cyan solid ink ingots; and 3.0 grams of Lampronol Black BR black colorant (ICI, C.I. Solvent Black 35) to produce solid black ink ingots.

EXAMPLE 2

This example demonstrates the high degree of lightness ($L^*$) of the phase change ink carrier and ink composition, and the high chroma ($C^*_{ab}$) of the phase change ink composition of the present invention.

Two 2 inch square light transmissive glass plates were joined at opposite ends with a U.V. curable epoxy resin leaving the remaining opposite ends open. The plates were joined so that the plate faces were separated by a space of about 20 micron and were offset about 3/16 of an inch at the open ends to form entry lips. A sample of each of the yellow, magenta and cyan phase change ink ingots described in Example 1 were added to the space by placing it on one of the entry lips. The plates were then heated to a temperature of 06° C. At that temperature the ink became molten and flowed into the space formed between the plate faces by capillary action. Therefore, when the phase change ink cooled, a phase change ink of a substantially uniform thickness was produced. The transmission spectra test data for each primary color are listed in Table 1 below. (Measurement conditions were: illuminant C, 2 degree observer, small area view, specular included, wavelength interval 10 nm.)

TABLE 1

| Sample | $L^*$ | $a^*$ | $b^*$ | $C^*_{ab}$ | $h_{ab}$ |
| --- | --- | --- | --- | --- | --- |
| Glass only | 92.34 | −1.65 | 1.80 | 2.44 | 132.57 |
| Glass with ink carrier | 86.51 | −0.64 | 4.54 | 4.58 | 98.03 |
| Glass with yellow ink | 82.94 | −12.46 | 66.70 | 67.85 | 100.58 |
| Glass with magenta ink | 59.15 | 64.55 | 24.86 | 69.25 | 338.98 |
| Glass with cyan ink | 65.93 | −35.70 | −19.28 | 40.70 | 208.44 |
| Glass with black ink | 23.72 | — | — | — | — |

The ink carrier and the yellow, magenta and cyan ink compositions of this invention had relatively high lightness ($L^*$) values, while the $L^*$ value of the black ink was relatively low high for the yellow, magenta and cyan inks of this invention.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A phase change ink carrier composition for producing a phase change ink composition in combination with a compatible colorant, comprising a fatty amide-containing material, said fatty amide-containing material comprising a tetraamide compound and a monoamide compound, said phase change ink carrier composition being in a solid phase at ambient temperature and in a liquid phase at elevated operating temperature, thin films of uniform thickness of said respective ink carrier composition and said ink composition produced therefrom having a high degree of lightness and chroma, and thin films of uniform thickness of said ink composition being rectilinearly light transmissive.

2. The phase change ink carrier composition of claim 1, wherein said mono-amide compound is a secondary mono-amide compound.

3. The phase change ink carrier composition of claim 1, wherein the weight ratio of said tetra-amide to said mono-amide is from about 2:1 to 1:10.

4. The phase change ink carrier composition of claim 1, which comprises from about 10 to 50 weight percent of a tetra-amine compound, from about 30 to 80 weight percent of a secondary mono-amide compound, from about 0 to 25 weight percent of a tackifier, from about 0 to 25 weight percent of a plasticizer, and from about 0 to 10 weight percent of a viscosity modifying agent.

5. The phase change ink carrier composition of claim 1, wherein said mono-amide compound comprises a composition which is represented by the structural formula:

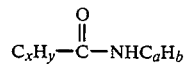

wherein:
x is an integer from 5 to 21
y is an integer from 11 to 43
a is an integer from 6 to 22
b is an integer from 13 to 45

6. The phase change ink carrier composition of claim 1, wherein said mono-amide compound comprises stearyl stearamide.

7. The phase change ink carrier composition of claim 2, wherein said tetra-amide compound comprises the reaction product of Dimer Acid, ethylene diamine, and stearic acid in a stoichiometric ratio of 1:2:2.

8. The phase change ink carrier composition of claim 1, wherein said fatty amide-containing compound comprises a plurality of fatty amide materials physically compatible with each other having a substantially single melting point transition.

9. The phase change ink carrier composition of claim 1, wherein said offset transfer is avoided at temperatures up to about 70° C.

10. The phase change ink carrier composition of claim 1, wherein said ink composition has a viscosity of from about 5 cps up to about 15 cps at up to about 150° C.

11. The phase change ink carrier composition of claim 1, wherein said ink composition has a melting point of at least about 85° C.

12. The phase change ink carrier composition of claim 1, wherein said ink composition comprises a subtractive primary colored phase change ink composition.

13. The phase change ink carrier composition of claim 1, wherein said colorants comprise any of a C.I. Solvent Dye, a Disperse Dye, a Basic Dye, an Acid Dye, and a Direct Dye.

14. The phase change ink carrier composition of claim 1, wherein the $C^*_{ab}$ value, of a substantially uniform thin film of about 20 micron thickness, of a subtractive primary yellow color phase change ink composition produced from said carrier composition, is at least about 50.

15. The phase change ink carrier composition of claim 1, wherein the $C^*_{ab}$ value, of a substantially uniform thin film of about 20 micron thickness, of a subtractive primary magenta color phase change ink composition produced from said carrier composition, is at least about 50.

16. The phase change ink carrier composition of claim 1, wherein the $C^*_{ab}$ value, of a substantially uniform thin film of about 20 micron thickness, of a subtractive primary cyan color phase change ink composition produced from said carrier composition, is at least about 30.

17. The phase change carrier composition of claim 1, wherein the L* value, of a substantially uniform thin film of about 20 micron thickness, of said carrier composition, is at least about 65.

18. The phase change ink carrier composition of claim 1, wherein the L* value, of a substantially uniform thin film of about 20 micron thickness, of a black color of a phase change ink composition produced from said carrier composition, is not more than about 35.

19. A phase change ink composition comprising a composition comprising a fatty amide-containing material, said fatty amide-containing material comprising a tetra-amide compound and a mono-amide compound and a compatible colorant, said phase change ink composition being in a solid phase at ambient temperature and in a liquid phase at elevated operating temperature, said ink composition having a high degree of lightness and chroma, and being rectilinearly light transmissive in a thin film of substantially uniform thickness.

20. A process producing a phase change ink carrier composition, comprising the step of using a fatty amide-containing compound, said fatty amide-containing material comprising a tetraamide compound and a mono-amide compound, said phase change ink carrier composition being in a solid phase at ambient temperature and in a liquid phase at elevated operating temperature thin films of uniform thickness of said ink carrier composition and said ink composition produced therefrom having a high degree of lightness and chroma, and thin films of uniform thickness of said ink composition being rectilinearly light transmissive.

21. A process for producing a phase change ink composition comprising the step of combining a phase change ink carrier composition, a fatty amide-containing compound comprising a tetraamide compound and a mono-amide compound, and a colorant, said phase change ink composition being in a solid phase at ambient temperature and in a liquid phase at elevated operating temperature, thin films of uniform thickness of said ink carrier composition and said ink composition produced therefrom having a high degree of lightness and chroma, and thin films of uniform thickness of said ink composition being rectilinearly light transmissive.

22. A phase change ink carrier composition comprising a tetra-amide compound and a mono-amide compound for producing a phase change ink composition in combination with a compatible colorant, said phase change ink carrier composition being in a solid phase at ambient temperature and in a liquid phase at elevated operating temperature, thin films of substantially uniform thickness of said ink carrier composition and ink composition produced therefrom having a high degree of lightness and chroma, and said ink composition being rectilinearly light transmissive in a substantially uniform thin film of about 20 micron thickness, the L* value of said carrier composition being at least about 65.

23. The phase change ink carrier composition of claim 22, wherein the $C^*_{ab}$ value of a substantially uniform thin film of about 20 micron thickness, of a subtractive primary yellow color phase change ink composition produced from said carrier composition, is at least about 50.

24. The phase change ink carrier composition of claim 22, wherein the $C^*_{ab}$ value of a substantially uniform thin film of about 20 micron thickness, of a subtractive primary magenta color phase change ink composition produced from said carrier composition, is at least about 50.

25. The phase change ink carrier composition of claim 22, wherein the $C^*_{ab}$ value of a substantially uniform thin film of about 20 micron thickness, of a subtractive primary cyan color phase change ink composition produced from said carrier composition, is at least about 30.

26. The phase change ink carrier composition of claim 2, wherein the L* value of a substantially uniform thin film of about 20 micron thickness, of a black color phase change ink composition produced from said carrier composition, is not more than about 35.

27. A phase change ink composition comprising a phase change ink carrier compositions comprising a tetra-amide compound and a mon-amide compound and a compatible colorant, said ink composition being solid phase at ambient temperature and in a liquid phase at elevated operating temperature, and having a high degree of lightness and chroma, and being rectilinearly light transmissive in thin films of substantially uniform thickness, wherein the $C^*_{ab}$ value of a substantially uniform thin film of about 20 micron thickness, of subtractive primary Yellow, magenta and cyan color phase change ink compositions are at least about 50 for said yellow ink composition, at least about 50 for said magenta ink composition, and at least about 30 for said cyan ink composition, and wherein the L* value of a substantially uniform thin film of about 20 micron thickness, of a black color phase change ink is not more that about 35.

28. The phase change ink composition of claim 27, wherein the $C^*_{ab}$ value of a substantially uniform thin film of about 20 micron thickness, of a subtractive primary yellow color phase change ink composition produced from said carrier composition, is at least about 67.

29. The phase change ink composition of claim 27, wherein the $C^*_{ab}$ value of a substantially uniform thin film of about 20 micron thickness, of a subtractive primary magenta color phase change ink composition produced from said carrier composition, is at least about 69.

30. The phase change ink carrier composition of claim 27, wherein the $C^*_{ab}$ value of a substantially uniform thin film of about 20 micron thickness, of a subtractive primary cyan color phase change ink composition produced from said carrier composition, is at least about 40.

31. The phase change ink carrier composition of claim 27, wherein the L* value of a substantially uniform thin film of about 20 micron thickness, o a black color phase change ink composition produced from said carrier composition, is not more than about 25.

* * * * *

UNITED STATES PATENT AND TRADEMARK OFFICE
CERTIFICATE OF CORRECTION

PATENT NO. : 4,889,560

DATED : December 26, 1989

INVENTOR(S) : Jaeger et al.

It is certified that error appears in the above-identified patent and that said Letters Patent is hereby corrected as shown below:

In the claims:

Column 8, line 38, reads "2" should be --1--.

Column 10, line 36, reads "Yellow" should be --yellow--.

Column 10, line 63, reads "o" should be --of--.

Signed and Sealed this

Fifteenth Day of January, 1991

Attest:

HARRY F. MANBECK, JR.

*Attesting Officer*  *Commissioner of Patents and Trademarks*